(12) United States Patent
Killen (10) Patent No.: US 6,682,430 B2
(45) Date of Patent: Jan. 27, 2004

(54) ADJUSTABLE MAGNETIC COUPLER

(75) Inventor: Richard Killen, Maple Valley, WA (US)

(73) Assignee: MagnaDrive Corporation, Seattle, WA (US)

(*) Notice: Subject to any disclaimer, the term of this patent is extended or adjusted under 35 U.S.C. 154(b) by 0 days.

(21) Appl. No.: 09/811,343

(22) Filed: Mar. 15, 2001

(65) Prior Publication Data

US 2002/0132670 A1 Sep. 19, 2002

(51) Int. Cl.[7] ............................................. F16D 27/01
(52) U.S. Cl. .................... 464/29; 192/84.5; 310/103
(58) Field of Search ........................... 464/29; 310/75 D, 310/103; 192/84.5

(56) References Cited

U.S. PATENT DOCUMENTS

| | | | | |
|---|---|---|---|---|
| 1,258,115 A | * | 3/1918 | Henderson | ................. 192/84.5 |
| 1,452,327 A | | 4/1923 | Thompson | |
| 1,481,655 A | | 1/1924 | Thompson | |
| 1,891,982 A | * | 12/1932 | Hodgson | ............... 192/84.5 X |
| 4,163,914 A | | 8/1979 | Keyes | |
| 5,477,093 A | | 12/1995 | Lamb | ....................... 310/75 D |
| 5,477,094 A | | 12/1995 | Lamb | ....................... 310/75 D |
| 5,668,424 A | | 9/1997 | Lamb | ......................... 310/103 |
| 5,834,872 A | | 11/1998 | Lamb | ......................... 310/103 |
| 5,880,548 A | | 3/1999 | Lamb | ......................... 310/103 |
| 6,005,317 A | | 12/1999 | Lamb | ......................... 310/103 |
| 6,072,258 A | * | 6/2000 | Lamb | .................... 310/103 X |
| 6,337,527 B2 | * | 1/2002 | Lamb | .................... 192/84.5 X |

FOREIGN PATENT DOCUMENTS

| | | |
|---|---|---|
| GB | 597399 | 1/1948 |
| GB | 1192895 | 5/1970 |
| GB | 2 039 158 A | 7/1980 |
| WO | WO 81/01633 | 6/1981 |

* cited by examiner

Primary Examiner—Greg Binda
(74) Attorney, Agent, or Firm—Seed IP Law Group PLLC (57) ABSTRACT

An adjustable coupler has a group of magnet rotors with permanent magnets separated by air gaps from non-ferrous conductor rotors presented by a group of conductor rotors. One of the rotors is mounted to its shaft via a slidable hub. The hub and the rotor attached thereto rotate with the shaft, but are movable lengthwise along the shaft. The air gaps are adjusted by axial movement of the hub and one of the groups relative to the other to vary the slip of the coupler and control the load speed under varying load conditions.

6 Claims, 7 Drawing Sheets

ADJUSTABLE MAGNETIC COUPLER

TECHNICAL FIELD

The present invention relates to permanent magnet couplers of the type having a magnet rotor on one shaft adjustably spaced from a conductor rotor on another shaft. More particularly, the invention relates to mounting the adjustable rotor to its respective shaft.

BACKGROUND OF THE INVENTION

Induction motors are used, for example, to drive fans, blowers, pumps and compressors. It has been recognized that when these motors are operated at full speed they normally have excess capacity as compared to the load requirements, and this excess capacity is compounded when the load is variable. It has also been recognized that if the output of the motors could be adjusted to provide only the needed power, a significant reduction of energy usage would result. Hence, variable speed drives (VSD's) have been developed in the form of electronic devices which match motor speed to that required for a given application. A typical VSD rectifies incoming AC voltage and current into DC, then inverts the DC back to AC at a different voltage and frequency. The output voltage and frequency is determined by the actual power needs and is set automatically by a control system or by an operator.

Heretofore, VSD's have generally been so expensive that they have not been used extensively for energy savings. It has been reported that VSD's require the availability of highly trained maintenance personnel and shorten motor life.

U.S. Pat. No. 5,477,094 (the '094 patent) shows a magnetic coupler in which a magnet rotor unit is straddled by two conductor rotors which are connected together to rotate as a conductor rotor unit on one shaft while the magnet rotor unit is mounted to rotate on a second shaft. The magnet rotor unit has a set of permanent magnets arranged with their opposite poles spaced by air gaps from ferrous-backed electroconductive rings mounted on the respective conductor rotors. Rotation of one of the two shafts results in rotation of the other shaft by magnetic action without there being any direct mechanical connection between the shafts.

The '094 patent also discloses the concept of having two magnet rotors rather than a single magnet rotor unit, with each magnet rotor having a respective set of permanent magnets spaced by an air gap from one of the electroconductive elements presented by the conductor rotors. The two magnet rotors are axially moveable relative to one another and are spring biased apart.

In U.S. Pat. No. 6,005,317 (the '317 patent), the magnet rotors are positively positioned relative to each other such as to vary their axial positions automatically at will from a remote control location to provide by air gap adjustment a variable torque from a constant speed motor to a variable torque load operating at a lower constantly maintained speed.

Instead of spring biasing the two magnet rotors as in the '094 patent, the positions of the magnet rotors in the '317 patent are controlled from a stationary control mechanism which communicates with an adjusting mechanism operating on the magnet rotors to selectively move them toward one another to widen the air gaps or to move them further apart to narrow the air gaps. Gap adjustment varies the rotational slip between the magnet rotor units and the conductor rotor units for a given torque load and hence affects the speed of the load. For a given torque load the air gaps can be adjusted to provide the torque at a preset rotational speed differential below the speed of the motor.

SUMMARY OF THE INVENTION

The present invention is directed toward adjustable magnetic couplers in which a magnet rotor and a conductor rotor are positioned in proximity with each other such that rotation of one rotor results in rotation of the other. A hub is engaged with a first shaft, and is configured to slide with respect to the first shaft but not rotate with respect to the first shaft. Consequently, as the first shaft rotates, the hub rotates with it. The magnet rotor is coupled to the hub and the conductor rotor is coupled to a second shaft, or vice versa. The rotors are configured to rotate with the respective shaft. A push-pull mechanism is rotatably coupled to the hub such that the push-pull mechanism maintains stationary even when the first shaft and the hub rotate. The push-pull mechanism is operative to move the hub and the rotor attached thereto axially along the first rotary shaft. Axial movement of one rotor with respect to the other rotor changes the distance between the magnet rotor and the conductor rotor, altering the performance of the coupler.

In another embodiment of the present invention, a pair of adjustable rotors are spaced from a fixed rotor assembly, and are adjustable through the use of a push-pull mechanism similar to that discussed above. A first adjustable rotor is linked to the second adjustable rotor such that movement of one rotor results in movement of the other. In one particular embodiment, movement of the hub and the first adjustable rotor in one direction results in a corresponding movement of the second adjustable rotor in an opposite direction. Accordingly, movement of the first adjustable rotor results in an adjustment of the spacing between both adjustable rotors and a third, fixed rotor. As the adjustable rotors are configured with magnets and the fixed rotor configured with an electroconductive ring, or vice versa, adjustment of the spacing between the three rotors results in an adjustment to the performance of the system.

In yet another embodiment of the present invention, the adjustable magnetic coupler comprises two fixed rotors and two adjustable rotors. The fixed rotors are coupled to a shaft to rotate with the shaft, but are not permitted to move axially along the shaft. The adjustable rotors, on the other hand, are movable in an axial direction with respect to the shaft, but are not permitted to rotate with respect to the shaft. One of the adjustable rotors is mounted on a slidable hub. The adjustable rotors are linked together such that axial movement of one adjustable rotor results in a corresponding axial movement of the other adjustable rotor. Consequently, adjustment by a push-pull mechanism of the hub and one adjustable rotor results in a corresponding adjustment of the other adjustable rotor. Using the push-pull mechanism, the first and second adjustable rotors can be spaced by a desired distance from the respective first and second fixed rotors, modifying the performance of the magnetic coupler system.

DETAILED DESCRIPTION OF THE INVENTION

The present invention is generally directed toward magnetic couplers in which a first rotating shaft transfers rotational energy to a separate, second rotating shaft. In particular, the present invention is directed toward a system which allows one rotor to be axially adjusted with respect to the other rotor to modify the performance of the magnetic coupler. Many specific details of certain embodiments of the invention are set forth in the following description and in FIGS. 1–7 to provide a thorough understanding of such embodiments. One skilled in the art, however, will understand that the present invention may have additional embodiments, or may be practiced without several of the details described in the following description.

Figure 1:
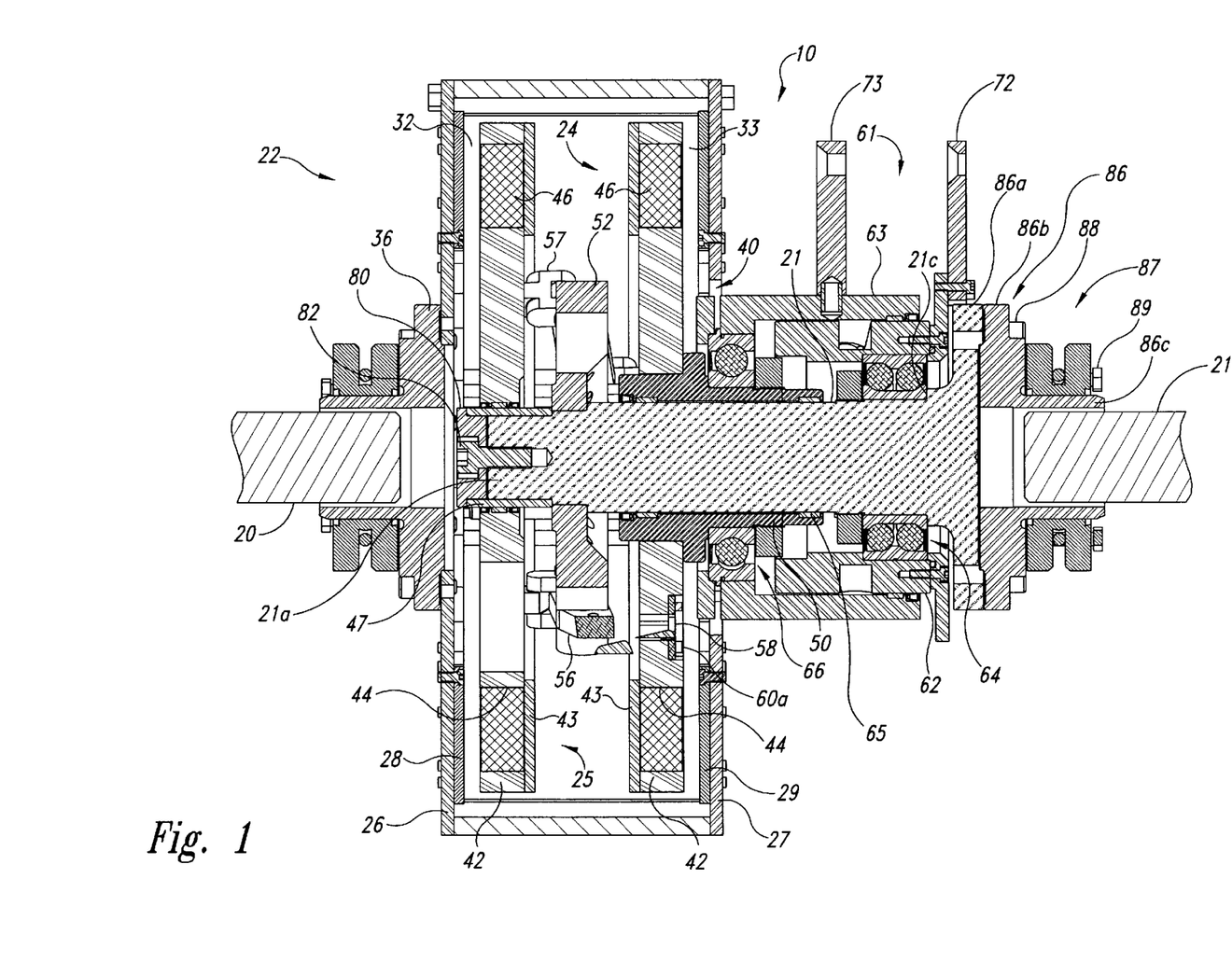
FIG. 1 is a longitudinal sectional view of a magnetic coupler according to an embodiment of the invention, shown in a narrow gap position, viewed along Section 1—1 in FIG. 5.
Figure 2:
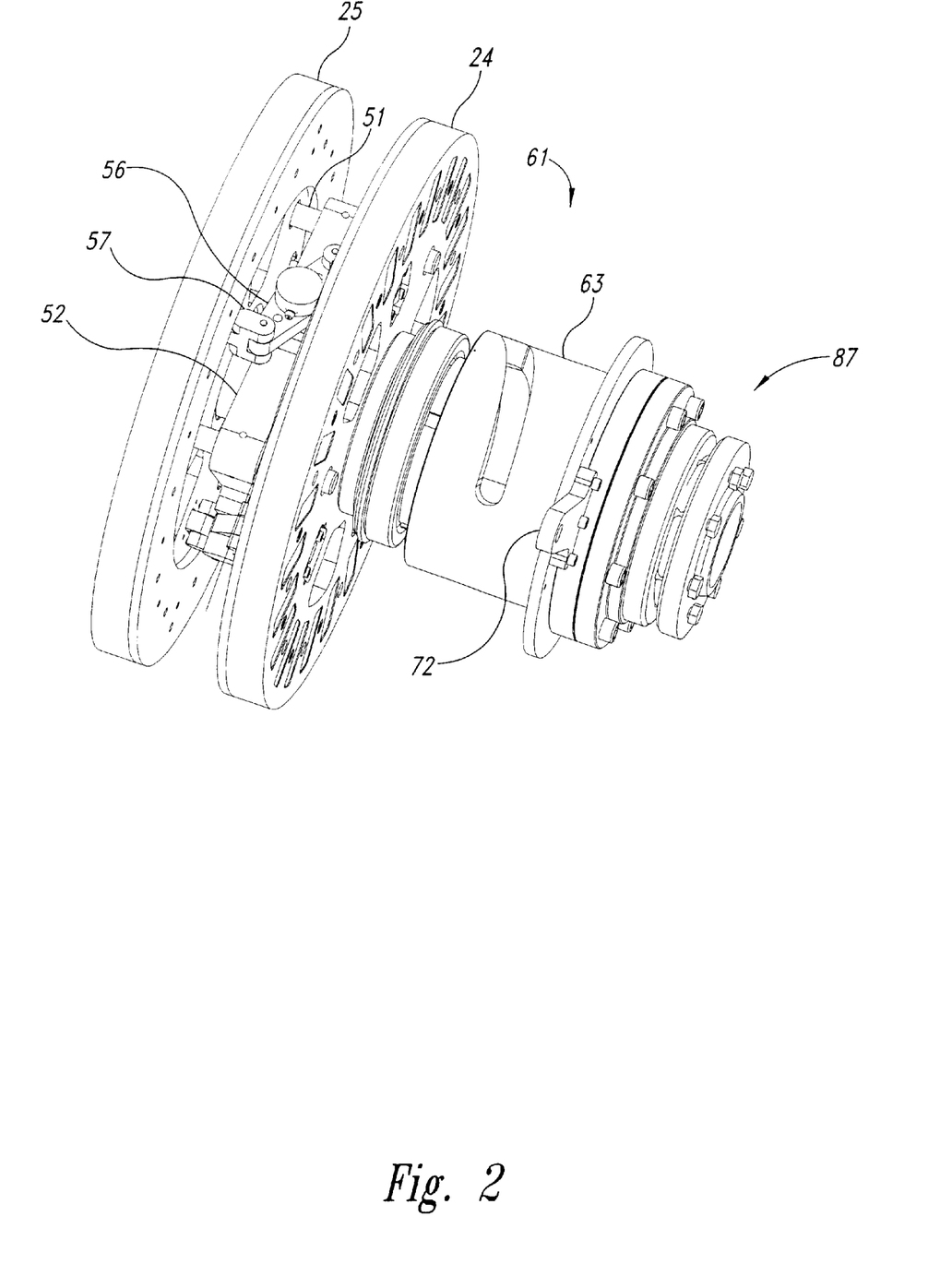
FIG. 2 is a perspective view of the magnetic coupler of FIG. 1 without the conductor rotors.

FIG. 1 illustrates a magnetic coupler 10 according to one embodiment of the present invention. An input shaft 20 and an output shaft 21 have mounted thereon a conductor rotor unit 22 and a pair of magnet rotors 24/25, respectively. The conductor rotor unit 22 has two axially spaced conductor rotors 26/27 having respective conductor rings 28/29 facing toward one another and formed from a non-ferrous material with high electrical conductivity, such as copper. The conductor rotor unit 22 is mounted on a conductor hub 36. Conductor rotor 27 is spaced apart from the output shaft 21 (and the assembly attached thereto, discussed below) by an annular clearance space 40. The hub 36 is mounted on the input shaft 20, such as by a wedge-type coupling or a key connection.

Each of the magnet rotors 24/25 has a non-ferrous mounting disc 42 backed by a ferrous backing disc 43, preferably of mild steel. The mounting discs 42 may be aluminum or a suitable non-magnetic composite, and each is formed with a set of spaced cutouts 44 arranged in a circle and receiving a respective set of permanent magnets 46 seated against the respective backing disc 43. Adjacent magnets may have their polarities reversed. The magnets 46 are spaced by air gaps 32/33 from the conductor rings 28/29 of the conductor rotor unit 22.

The conductor rotors 26/27 can be formed with ventilation holes or similar features to assist in the circulation of air through the air gaps 32/33 for cooling the conductor rings 28/29. Cooling air for the conductor rings 28/29 is free to enter the air gaps 32/33 from the clearance space 40.

In accordance with the illustrated embodiment of the present invention, the magnet rotors 24/25 are mounted so as to rotate in unison with the output shaft 21, and also to be axially moveable relative to one another in opposite axial directions for adjustment of the air gaps 32/33. To this end, magnet rotor 24 is fixedly coupled to a hub 50 that is engaged with the output shaft 21 to slide along the length of the output shaft, but not to rotate with respect to the output shaft. In the illustrated embodiment, a plurality of bushings 65 are positioned between the hub 50 and the shaft 21. The illustrated bushings 65 are spaced apart from each other axially with respect to the shaft 21. The hub 50, and with it the magnet rotor 24, are thus movable axially to adjust air gap 33. Magnet rotor 25 is slidably engaged with a bushing 47 at a distal end of the output shaft 21 to move axially with respect to the output shaft, but not to rotate with respect to the output shaft. Axial movement of magnetic rotor 25 with respect to output shaft 21 changes the air gap 32.

As illustrated in FIGS. 2–7, the pins 51 extend through the magnet rotors 24,25. As best illustrated by comparing FIGS. 3 and 4, when the hub 50 and magnet rotors 24,25 move axially with respect to the shaft 21, the magnet rotors also move axially with respect to the pins 51.

Figure 7:
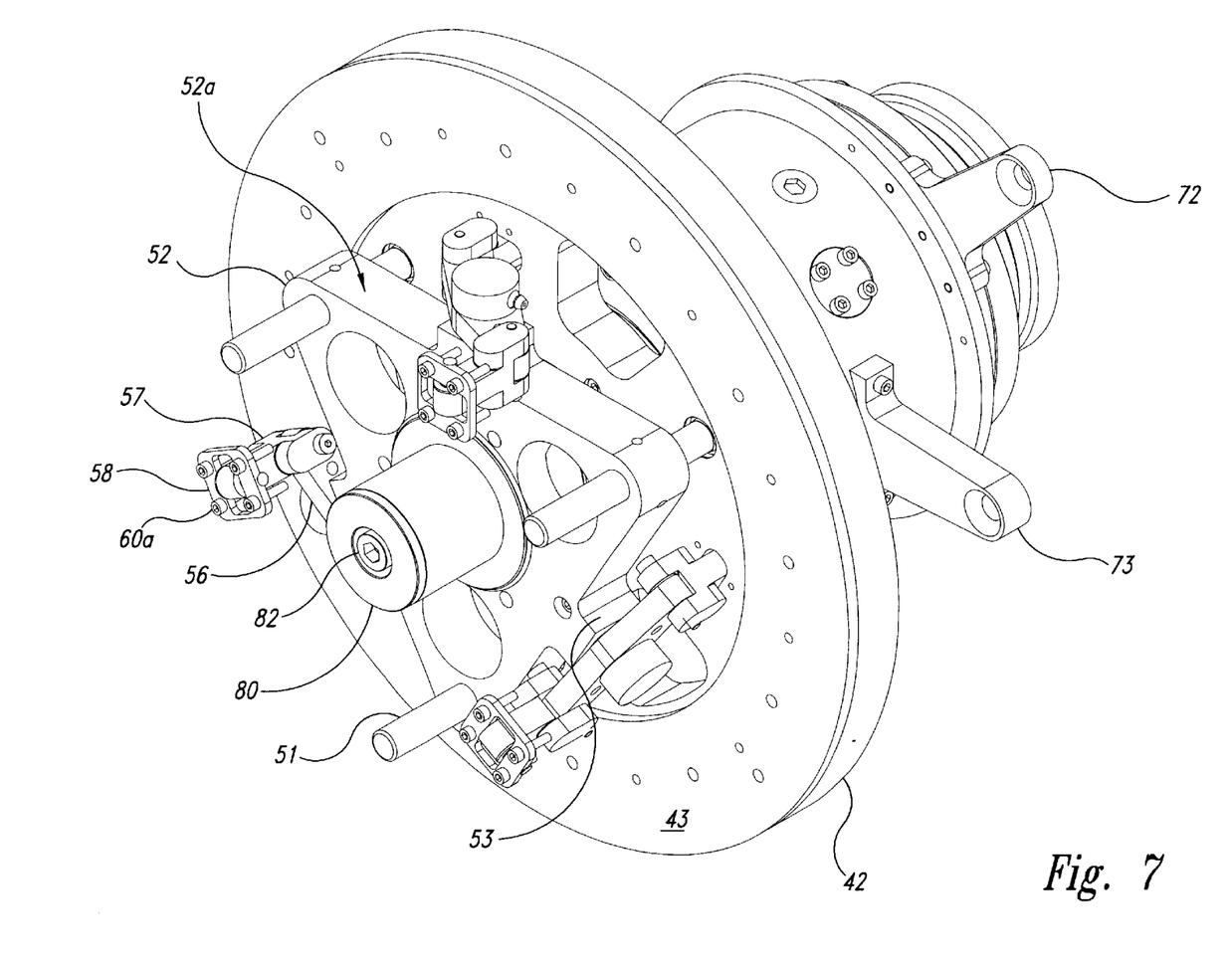
FIG. 7 is a perspective view of the portion of the magnetic coupler of FIG. 2 wherein the magnet rotor in the forefront has been removed.

A push-pull means 61 is provided to move the magnet rotors 24/25 axially along a rotary axis of the output shaft 21 in opposite directions to vary the width of the air gaps 32/33. The push-pull means 61 comprises a barrel element 63, an inner barrel 62, and the hub 50 for axially moving the magnet rotor 24, and a mechanism linked between the magnet rotors for moving the magnet rotor 25 in response to movement of the magnet rotor 24. In the illustrated embodiment, the second mechanism includes a type of transfer plate, such as a fifth rotor 52 and pins 51 (FIG. 7). The fifth rotor 52 is axially and rotationally fixed with respect to the shaft 21.

Figure 5:
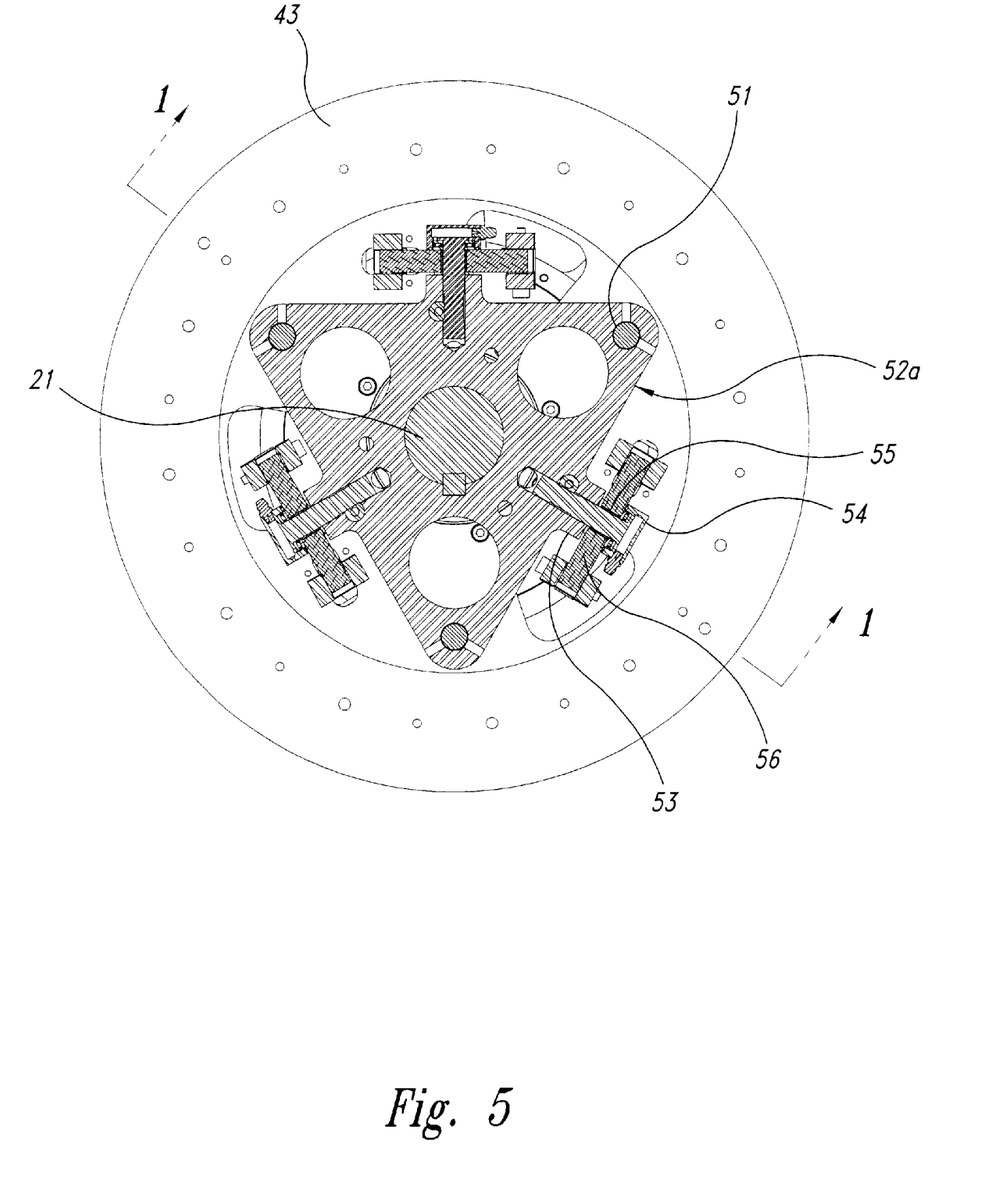
FIG. 5 is a transverse sectional view of the portion of the magnetic coupler of FIG. 4, viewed along Section 5—5.
Figure 6:
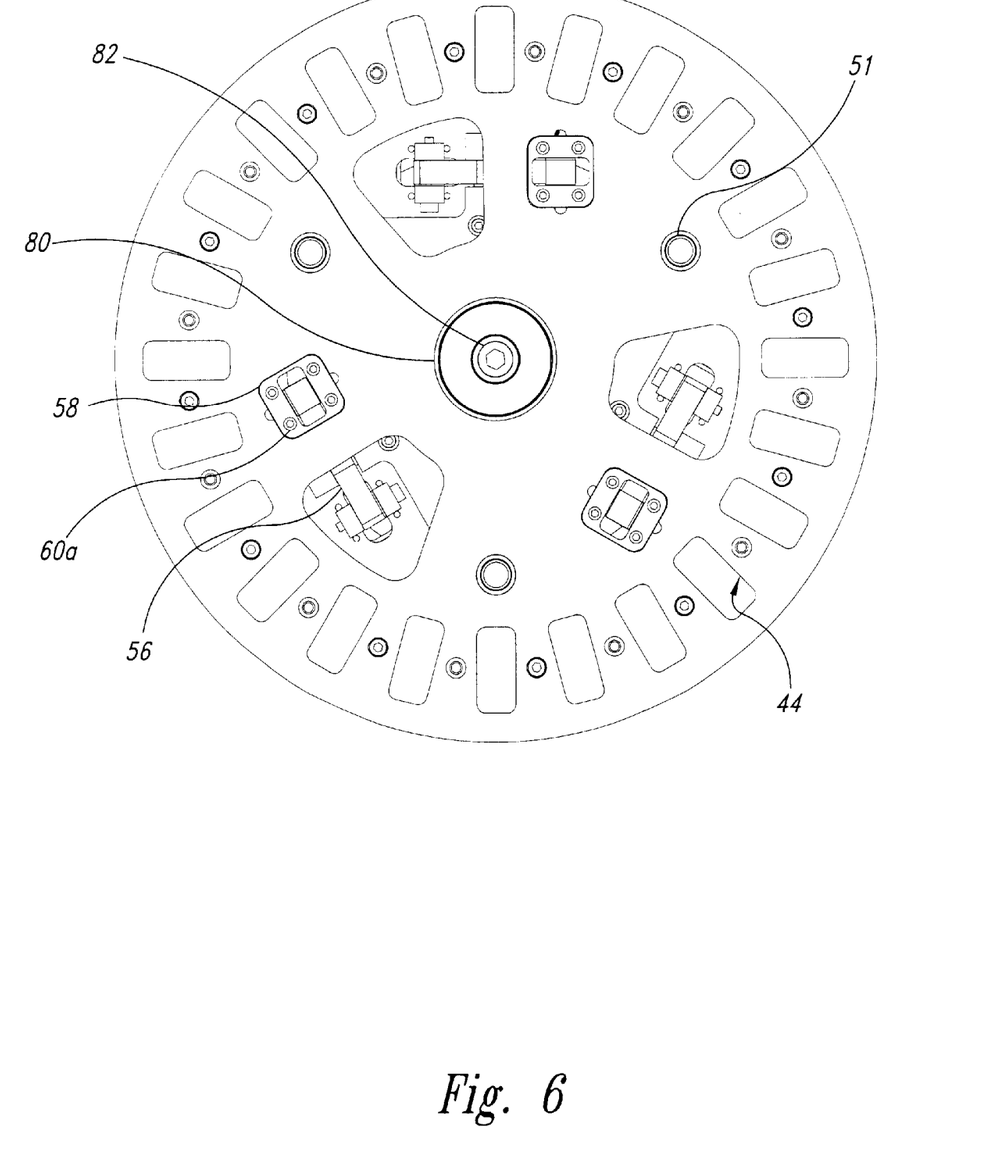
FIG. 6 is a left end view of the portion of the magnetic coupler of FIG. 2.

As best illustrated in FIGS. 5 and 7, the fifth rotor 52 in the illustrated embodiment is generally triangle-shaped in elevation providing three outer edge faces 52a, each of which has a central ear 53 projecting radially therefrom. The ears 53 are formed with radial bores extending toward the shaft 21 to receive fasteners 54 on which bushings or bearings 55 are sleeved (FIG. 5). The bearings 55 receive center hub portions of swing units 56, each pivotally attached to a link 57, which is in turn pivotally attached to a flange 58 (FIG. 7). The flanges 58 may be mounted on the discs 42 by cap screws 60a (FIG. 7). For each assembly, one flange 58 is attached to one of the magnet rotors 24/25 and an opposing flange is attached to the other magnet rotor. Consequently, when the first magnet rotor 24 moves axially, the magnet rotor and the flange 58 move the adjacent link 57, which in turn rotates the swing unit 56, which in turn urges the opposing link 57 to move the other magnet rotor 25. Consequently, axial movement in a first direction by magnet rotor 24 results in axial movement in an opposing second direction by magnet rotor 25. In the illustrated embodiment, the bearing 55 is located in the center of the swing unit 56. Consequently, the amount of movement by the second magnet rotor 25 is the same as the amount of movement by the first magnet rotor 24.

When the magnet rotor 24 is pushed away from the conductor rotor 27 to increase the width of the air gap 33, the other magnet rotor 25 is pulled toward the fifth rotor 52, increasing the width of the air gap 32. Likewise, when the magnet rotor 24 is pulled toward the conductor rotor 27 to narrow the width of the air gap 33, the other magnet rotor 25 will be pushed toward the conductor rotor 26 and narrow the air gap 32.

Figure 3:
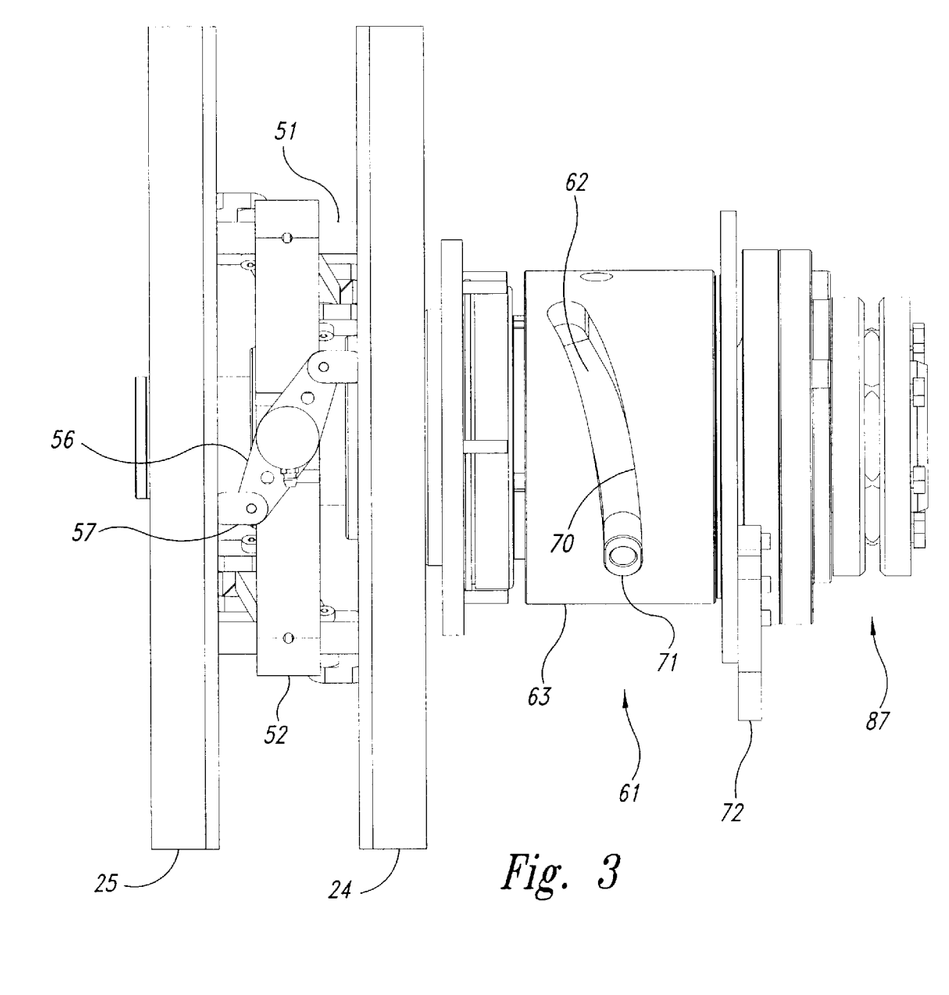
FIG. 3 is a plan view corresponding to FIG. 2.
Figure 4:
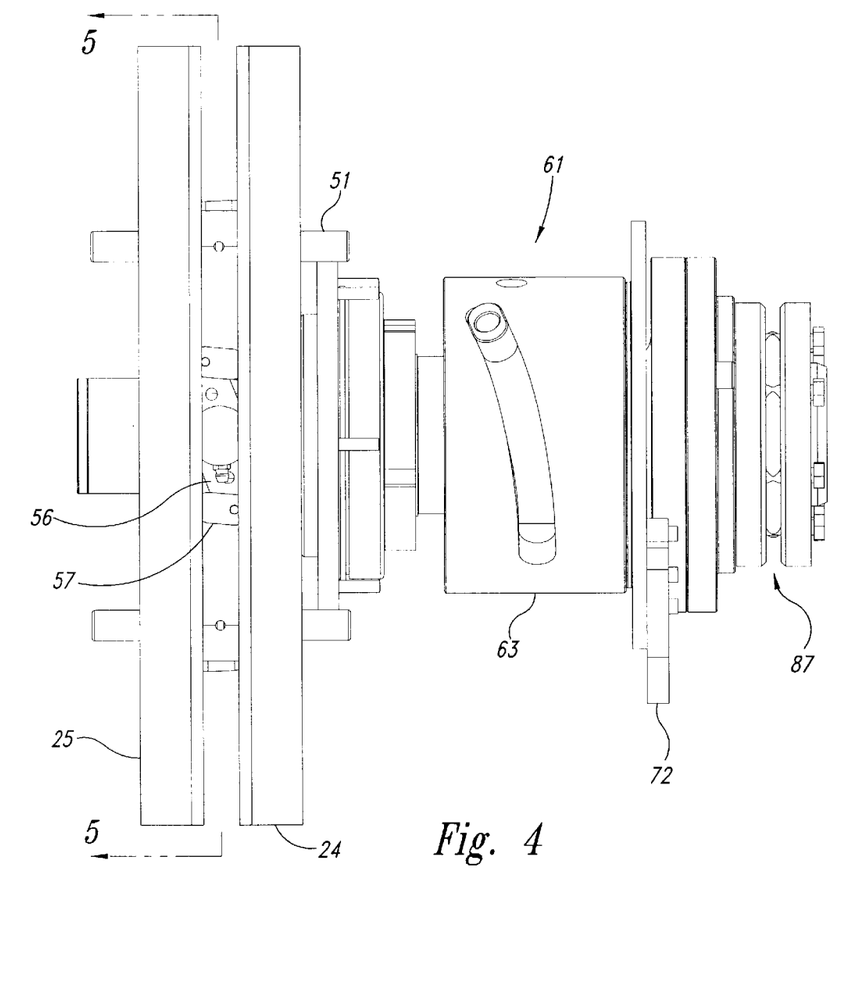
FIG. 4 is a plan view like FIG. 3, but with the gap adjustment mechanism retracted so that the magnet rotors are in a wide gap position.

As best illustrated in FIGS. 1 and 3, pushing and pulling of the magnet rotor 24 to vary the width of the air gaps 32/33 can be accomplished by using a barrel cam 61 which has an inner barrel element 62 partially overlapped by the barrel element 63. The inner barrel element 62 is mounted by a first bearing unit 64 on the output shaft 21 and the outer element 63 is mounted by a second bearing unit 66 to the hub 50. The output shaft 21 and hub 50 can thus rotate together with respect to the barrel cam 61. The barrel element 63 has a groove 70 which engages a sliding block 71 (FIG. 3)

coupled to the inner barrel element 62. A first arm 72 is attached to the inner barrel 62 and a second arm 73 (FIG. 1) is attached to the outer barrel 63. Relative movement of the first and second arms 72/73 results in barrel cam 61 moving the hub 50 axially with respect to the output shaft 21.

Axial movement of the outer barrel 63 acts through the second bearing 66 to correspondingly push or pull the magnet rotor 24. As before described, this results in equal endwise motion of the other magnet rotor 25 in the opposite direction by responsive operation of the swing arms 56. Thus, selective relative movement of the first and second arms 72/73 results in varying the air gaps 32/33, and thereby varies the output speed of the magnetic coupler 10. The first and second arms 72/73 may, for example, be connected to a stationary electric rotary positioner which is controlled by a process controller. If, for example, the load is a pump whose flow output is to be controlled, a measuring device in the output stream feeds the output data to the process controller which then signals the rotary positioner for the required rotary movement of the first or second arm 72/73 to properly adjust the output speed of the magnetic coupler.

The output shaft 21, rather than being the actual input shaft of the load, can be an add-on shaft section as shown in FIG. 1. This add-on section of output shaft 21 is connected at a distal end portion 21a to the fifth rotor 52 via an end plate 80 which covers the inner end face of the add-on section of output shaft 21, and bushing 47 which extends between the end plate and the fifth rotor. A bolt 82 connects the end plate 80 to the shaft 21.

The shaft 21 expands from the necked portion 21a to an intermediate cylindrical portion receiving the hub 50, and then is formed with an annular shoulder 21c against which the inner race of the first bearing 64 is seated. The coupler 86 has a complementary adapter hub component 86b with a neck 86c sized to receive the actual input shaft 21 of the load. A wedge-type squeeze unit 87 is sleeved on the coupler neck 86c to force fit the coupler 86 to the shaft 21 responsive to tightening of screws 89. The hub components 86a and 86b of the coupler 86 are secured together by bolts 88. A squeeze unit similar to unit 87 can also be used to secure hub 36 to the shaft 20.

The described arrangement incorporating the shaft section 21 and coupler 86 makes it possible to easily install or remove the magnetic coupling 10 of the present invention without moving the load and its related input shaft 21 or the prime motor and its shaft 20. The structure also allows the magnetic coupler 10 to be used with loads or motors having varying shaft sizes. By replacing flange 86 with a reducing flange or an oversized flange, the same magnetic coupler 10 can be used in more situations.

The present invention has numerous advantages over magnetic couplers of the prior art. For example, because the first magnet rotor 24 is attached to the hub 50 and the hub is attached to the output shaft 21, the magnet rotor is more stable than in prior versions where a bearing was situated between the magnet rotor 24 and the output shaft 21. The close relationship between the magnet rotor 24, the hub 50, and the output shaft 21 results in improved concentricity and reduced angular deflection of the magnet rotor out of its operating alignment. Also, because the hub 50 rotates with the output shaft 21, the relative rotation between the parts is transferred to one of the bearings 64/66. It is thus less likely that adjacent parts will make contact during operation, contact which would result in either seizing or extreme wear.

Still further, the pivotal couplings swing units 56, link 57, and flange 58 between the first and second magnet rotors 24/25 remove all torsional forces from the pivotal coupling assembly, items swing units 56, link 57, flange 58, fasteners 54, and bearings 55 and, as a result, from the magnet rotors. Also, pivoting couplings, swing units 56, link 57, and flange 58, as opposed to sliding couplings, will result in less wear and are less likely to be impeded or blocked in their travel. For each of these reasons, the relative positions of motion between the magnet rotors 24/25 will be more precisely controlled.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An adjustable magnetic coupler comprising:

first and second rotary shafts at least substantially aligned along a rotary axis;

a transfer plate fixed with respect to the first rotary shaft to rotate as a unit therewith about the rotary axis;

a hub disposed around the first rotary shaft and being slidably engaged therewith to move axially along at least a portion of the length of the first rotary shaft, the hub being configured to rotate with the first rotary shaft about the rotary axis;

a first rotor fixed to the hub to slide axially as a unit therewith with respect to the first rotary shaft and to rotate as a unit therewith about the rotary axis, the first rotor being rotatably fixed with respect to the transfer plate and the first rotary shaft such that rotation of the first rotary shaft results in rotation of the first rotor;

a second rotor fixedly coupled to the second rotary shaft to rotate as a unit therewith about the rotary axis;

one of the first and second rotors having a body with magnetic material circumferentially spaced thereabout;

the other of the first and second rotors having a body with non-ferrous electroconductive material circumferentially spaced thereabout;

a push-pull mechanism coupled to the hub and operable to move the hub and the first rotor axially with respect to the first rotary shaft to adjust a spacing distance between the first rotor and the second rotor, the push-pull mechanism being configured not to rotate with the hub or the first shaft; and a bearing positioned between the push-pull mechanism and the hub to allow the hub to rotate with the first rotary shaft, reducing the likelihood of seizure or wear between the two.

2. An adjustable magnetic coupler comprising:

first and second rotary shafts at least substantially aligned along a rotary axis;

a transfer plate assembly including a transfer plate and a plurality of pins, the transfer plate being fixed with respect to the first rotary shaft to rotate as a unit therewith about the rotary axis, the plurality of pins projecting from the transfer plate;

a hub disposed around the first rotary shaft and being slidably engaged therewith to move axially along at least a portion of the length of the first rotary shaft;

a first rotor fixed to the hub to slide axially as a unit therewith with respect to the first rotary shaft and to rotate as a unit therewith about the rotary axis, at least one of the plurality of pins extending through the first rotor, the first rotor being configured to move axially with respect to the pin as the hub and first rotor move axially with respect to the first rotary shaft, the first rotor being rotatably fixed with respect to the transfer plate and the first rotary shaft such that rotation of the first rotary shaft results in rotation of the first rotor;

a second rotor fixedly coupled to the second rotary shaft to rotate as a unit therewith about the rotary axis;

one of the first and second rotors having a body with magnetic material circumferentially spaced thereabout;

the other of the first and second rotors having a body with non-ferrous electroconductive material circumferentially spaced thereabout;

a push-pull mechanism coupled to the hub and operable to move the hub and the first rotor axially with respect to the first rotary shaft to adjust a spacing distance between the first rotor and the second rotor, the push-pull mechanism being configured not to rotate with the hub or the first shaft; and a bearing positioned between the push-pull mechanism and the hub to allow the hub to rotate with the first rotary shaft, reducing the likelihood of seizure or wear between the two.

3. The adjustable magnetic coupler of claim 2 wherein the magnetic material is circumferentially spaced about the first rotor.

4. The adjustable magnetic coupler of claim 2 wherein the magnetic material is a permanent magnet material.

5. The adjustable magnetic coupler of claim 2 wherein the magnetic material comprises a plurality of permanent magnets.

6. The adjustable magnetic coupler of claim 2 wherein the non-ferrous electroconductive material is in the form of a continuous ring.

* * * * *